No. 754,117. PATENTED MAR. 8, 1904.
J. A. BEDWORTH.
RIBBON SPOOL FOR TYPE WRITING MACHINES.
APPLICATION FILED DEC. 10, 1903.
NO MODEL.

Witnesses,
Edward H. Allen
W. C. Lunsford

Inventor,
John A. Bedworth,
By Crosby Gregory.
Attys.

No. 754,117. Patented March 8, 1904.

UNITED STATES PATENT OFFICE.

JOHN A. BEDWORTH, OF BOSTON, MASSACHUSETTS, ASSIGNOR TO F. S. WEBSTER COMPANY, OF BOSTON, MASSACHUSETTS, A CORPORATION OF MAINE.

RIBBON-SPOOL FOR TYPE-WRITING MACHINES.

SPECIFICATION forming part of Letters Patent No. 754,117, dated March 8, 1904.

Application filed December 10, 1903. Serial No. 184,514. (No model.)

*To all whom it may concern:*

Be it known that I, JOHN A. BEDWORTH, a citizen of the United States, and a resident of Boston, county of Suffolk, State of Massachusetts, have invented an Improvement in Ribbon-Spools for Type-Writing Machines, of which the following description, in connection with the accompanying drawings, is a specification, like characters on the drawings representing like parts.

This invention has for its object the production of a very cheap and simple ribbon-spool particularly adapted to hold or sustain the ink-ribbon in a type-writing machine and to be inserted in the latter when a fresh ink-ribbon is required. By using in the machine the spool or reel on which the ribbon is wound and sold by the manufacturer the necessity for unwinding the ribbon and rewinding it in the machine is obviated—a matter of considerable moment, as thereby soiling of the fingers of the operator is avoided and loss of time is prevented. In order to enable ribbon-spools to be so used, they must be made very cheaply, while possessing sufficient strength and rigidity to stand up to the work when placed in the machine. These objects have been borne in mind in the present invention, and I have herein shown and described a ribbon-spool made of two parts, one of which is a counterpart of the other, the hub between the heads and upon which the ribbon is wound being formed of parts or sections integral with the heads.

The various novel features of my invention will now be fully described in the subjoined specification and particularly pointed out in the claims appended thereto.

Figure 1:
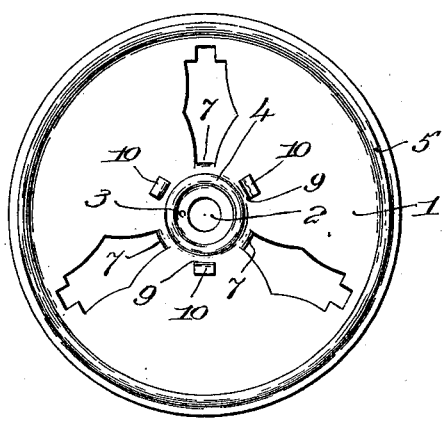
Figure 2:
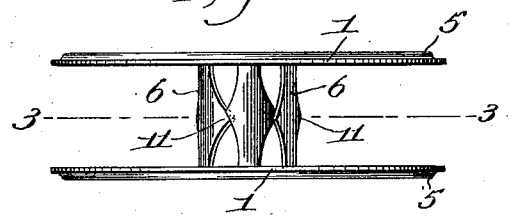
Figure 3:
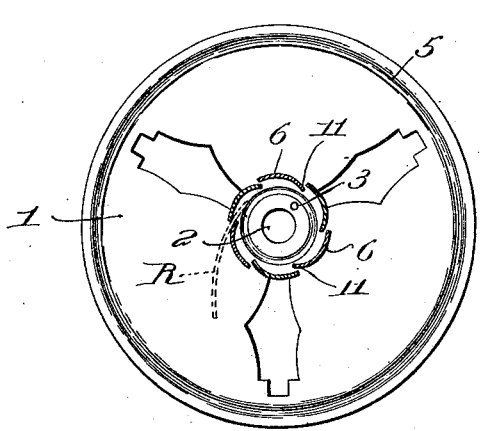
Figure 4:
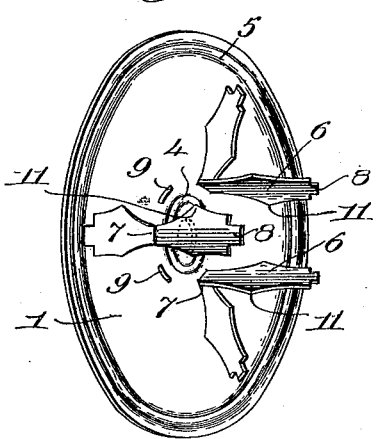

Figure 1 is a side elevation of a ribbon-spool embodying one form of my present invention. Fig. 2 is a top or plan view thereof. Fig. 3 is a section of the spool taken on the line 3 3 through the hub and between the heads; and Fig. 4 is an inner face view in perspective of one of the parts of the spool, the hub-sections being bent up into position.

In carrying out my invention I prefer to make the spool of thin strong sheet metal, and I have herein shown the spool as composed of two like heads 1, circular or disk-like, each having a central aperture 2, a small eccentric hole 3, and preferably two annular strengthening ribs or corrugations 4 5. Each head is stamped or struck up from sheet metal, and when so stamped out a plurality of hub-sections 6 are simultaneously made, connected at their inner ends with the head by narrow necks 7. (See Fig. 4.) At its outer or free end each section 6 is shaped to present a narrow tongue 8, which is adapted to pass through a slot 9 in the opposite head when the parts are assembled, the ends of the tongues projecting through the heads being bent over or upset at 10, Fig. 1, to rigidly connect the heads. As best shown in Figs. 1 and 4, each head is herein provided with three symmetrically-arranged hub-sections 6, and the slots 9 are alternated therewith, the slots and bases of the sections being circularly arranged concentric with the axial aperture 2. When the head is stamped out, the hub-sections radiate from its center; but thereafter they are bent up at right angles to the head, and when the two members of the spool are assembled the sections of one head alternate with the sections of the other head and form the hub upon which the ink-ribbon is wound. Each hub-section is considerably widened between its neck and tongue, and at one edge such widened portion is extended to form a prong 11, Figs. 2, 3, and 4.

I prefer to slightly curve the hub-sections transversely of their length, as shown in Fig. 3, to make the hub present a substantially cylindrical surface, the prongs 11 being inturned and extended beneath the edges of the next adjacent sections.

The end of the ink-ribbon R (see dotted lines, Fig. 3) is inserted between any two of the hub-sections and caught upon a prong 11, and then the ribbon is wound upon the hub between the heads 1. Inasmuch as the holding-prong extends beneath the edge of the next section a pull on the ribbon tends to draw the prong outward firmly against such adjacent section, so that the ribbon cannot be pulled off by the strain in the machine when in use.

It may be stated that the ribbon-spool shaft in the machine is extended through the apertures 2 and the hole 3 serves to receive a pin on the shaft to cause rotation of the spool therewith.

The openings 12 in the heads, from which the hub-sections are bent out at their necks 7, permit the ribbon to be observed through the heads when desired.

The cheapness of construction will be manifest from the foregoing description taken in connection with the drawings.

So far as I am aware it is broadly new to form a ribbon spool or reel of two members to constitute heads and an intermediate hub, and accordingly my invention is not restricted to the precise construction shown nor to the specific shape or number of the hub-sections, as changes or variations may be made without departing from the spirit and scope of my invention.

Having fully described my invention, what I claim as new, and desire to secure by Letters Patent, is—

1. A ribbon-spool consisting of two like heads each having a plurality of integral hub-sections, and means to attach the hub-sections of one head directly and permanently to the other head, and vice versa.

2. A ribbon-spool consisting of two like heads each having a plurality of integral hub-sections, bent at right angles thereto and each having a tongue at its free end, and a slot in the head between each two hub-sections thereof, the tongues of the sections on one head being extended through the slots in the other head and upset, and vice versa, to connect the heads and form a hub between them.

3. A ribbon-spool consisting of two disk-like sheet-metal heads each having a plurality of integral hub-sections bent at right angles thereto and terminating each in a tongue, each section being curved transversely and having a prong on one edge, the heads having a corresponding number of slots alternating with the sections and circularly arranged, the tongues of the sections integral with each head being extended through the slots of the other head, and upset to connect the heads, the prong on each section being inturned under the next adjacent section, to engage and hold the end of a ribbon to be wound upon the hub.

4. A ribbon-spool consisting of two disk-like sheet-metal heads each having a plurality of integral hub-sections, stamped out of the head and bent at right angles thereto, each section having an inturned prong on one edge and terminating at its free end in a narrow tongue, each head having a central opening and slots alternating with the sections, the slots and bases of the sections being circularly arranged concentric with the central opening, the tongues of the hub-sections on each head passing through the slots in the other head and being upset, to rigidly connect the heads, the several inturned prongs of the hub-sections serving as ribbon-holding devices.

5. A ribbon-spool consisting of two disk-like sheet-metal heads each having a plurality of hub-sections integrally connected therewith by narrow necks and bent thereat at right angles to the head, each section terminating in a tongue, each head having a series of circularly-arranged slots alternating with the necks of the sections, to receive the tongues of the sections on the other head, the sections of the two heads alternating with each other to form a hub between the heads.

In testimony whereof I have signed my name to this specification in the presence of two subscribing witnesses.

JOHN A. BEDWORTH.

Witnesses:
 JOHN C. EDWARDS,
 MARGARET A. DUNN.